US011606716B2

(12) United States Patent
Yoon

(10) Patent No.: US 11,606,716 B2
(45) Date of Patent: Mar. 14, 2023

(54) CONFIGURING TELECOMMUNICATIONS NETWORK USING DATA OBTAINED FROM USER EQUIPMENT

(71) Applicant: T-Mobile USA, Inc., Bellevue, WA (US)

(72) Inventor: Jong Sung Yoon, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 163 days.

(21) Appl. No.: 16/885,118

(22) Filed: May 27, 2020

(65) Prior Publication Data

US 2021/0377788 A1 Dec. 2, 2021

(51) Int. Cl.
*H04W 28/02* (2009.01)
*H04L 5/00* (2006.01)
*H04B 17/318* (2015.01)
*H04W 4/021* (2018.01)

(52) U.S. Cl.
CPC ...... *H04W 28/0284* (2013.01); *H04B 17/318* (2015.01); *H04L 5/0051* (2013.01); *H04W 4/021* (2013.01); *H04W 28/0226* (2013.01)

(58) Field of Classification Search
CPC ............ H04W 28/0284; H04W 4/021; H04W 28/0226; H04B 17/318; H04B 17/23; H04L 5/0051
See application file for complete search history.

(56) References Cited

U.S. PATENT DOCUMENTS

| 10,477,426 | B1 * | 11/2019 | Tiwari | H04L 43/0852 |
| 11,082,862 | B1 * | 8/2021 | Thakur | H04W 16/18 |
| 2020/0092732 | A1 * | 3/2020 | Raj | H04W 24/10 |
| 2020/0178085 | A1 * | 6/2020 | Ertimo | H04W 16/18 |
| 2021/0160744 | A1 * | 5/2021 | Zetterberg | H04W 36/0058 |

* cited by examiner

*Primary Examiner* — Jae Y Lee
*Assistant Examiner* — Aixa A Guadalupe Cruz
(74) *Attorney, Agent, or Firm* — Lee & Hayes, P.C.

(57) ABSTRACT

Techniques and systems relate to utilizing network metrics to optimize performance and network coverage for a telecommunications network. Using techniques described herein, a telecommunications network may utilize network metrics collected from user equipment (UE) devices to determine how where to deploy cells, such as 5G cells, in order to optimize network performance. Metrics are collected by UE that indicates the use of different wireless access technologies (e.g., 3G, 4G, 4G LTE, 5G, . . . ) within a telecommunications network.

20 Claims, 6 Drawing Sheets

CONFIGURING TELECOMMUNICATIONS NETWORK USING DATA OBTAINED FROM USER EQUIPMENT

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

Moving forward, future telecommunications systems may include fifth generation (5G) cellular-wireless access technologies to provide improved bandwidth and decreased response times to a multitude of devices that may be connected to a network. Network coverage for these telecommunications systems is often allocated, in part, using prediction analysis of infrastructure that considers a variety of factors, such as cell tower locations, power associated with the cell towers, and other factors.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
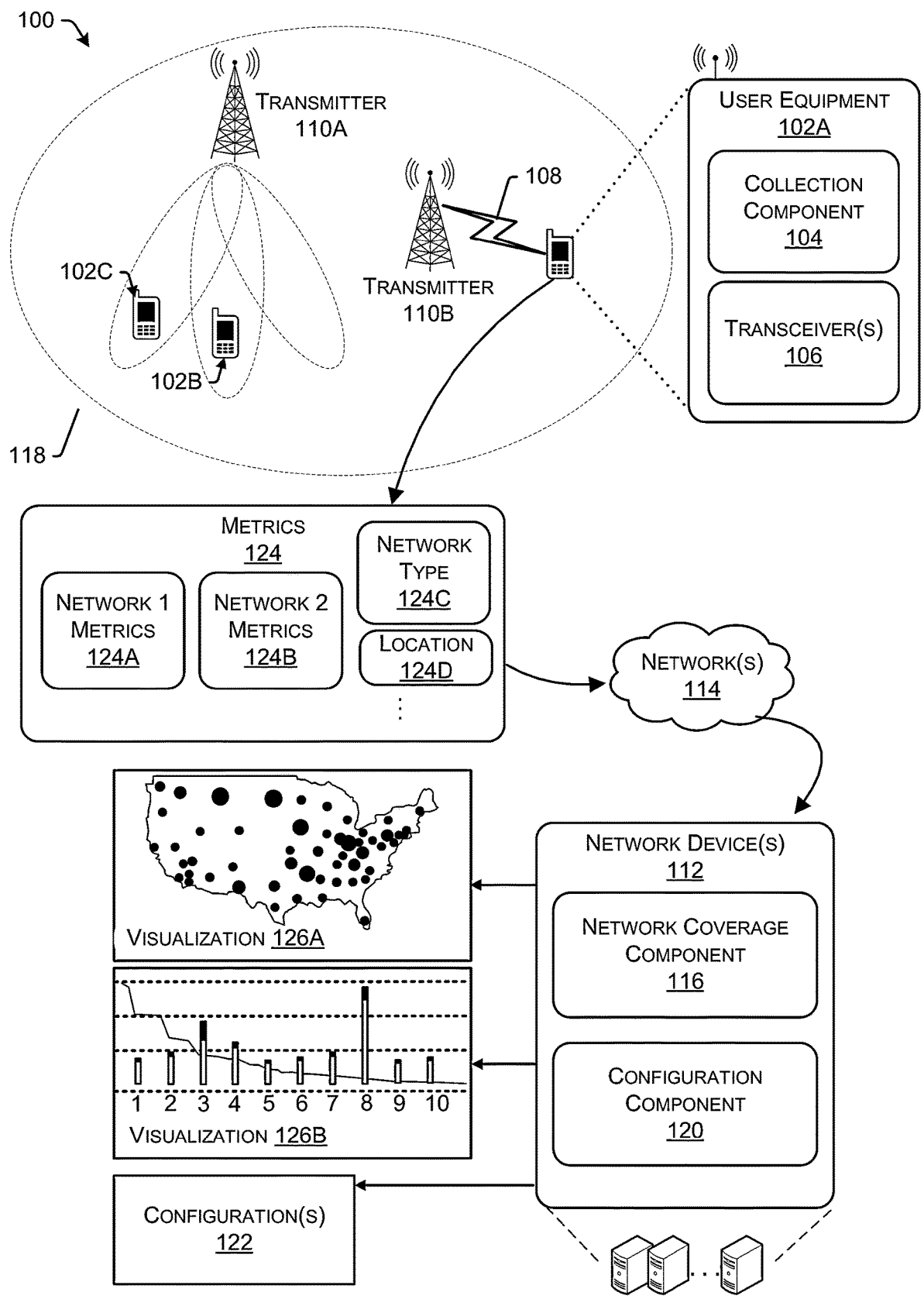
FIG. 1 is a block diagram showing an illustrative environment that collects metrics from user equipment, associated with a telecommunications network, that are utilized to generate configuration data utilized to configure network resources within a telecommunications network.

Described herein are techniques and systems for utilizing network metrics to optimize performance and network coverage for a telecommunications network. Using techniques described herein, a telecommunications network may utilize network metrics collected from user equipment (UE) devices to determine how where to deploy cells, such as 5G cells, in order to optimize network performance. Metrics are collected by UE that indicates the use of different wireless access technologies (e.g., 3G, 4G, 4G LTE, 5G, . . . ) within a telecommunications network.

The metrics collected by UEs may be utilized to indicate the different types of cellular coverage utilized within different areas, the number of UEs utilizing each of the different types of cellular coverage within each of the different areas, and the like. The network metric data is then utilized to configure/modify the deployment of 5G cells, or other cells, within the network.

The metrics may also be utilized to adjust one or more parameters of the telecommunications network. As an example, assume that a mobile service provider is planning on upgrading an existing LTE telecommunications network to include 5G cells. Determining where to add the 5G cells, however, can be very difficult. Without actual usage data collected from UE within the telecommunications network, determining where to place 5G cells within the telecommunications network is only a guess.

Adding cells where they would not be utilized is not only costly, but it results in a telecommunications network that includes underutilized cells. Further, not placing cells where they are needed results in poor network performance and unsatisfied users. Using the techniques described, the metrics collected from UEs within the telecommunications network can be utilized to determine areas that do not have enough 5G cells, have too many 5G cells. For example, the data may be used to upgrade areas within the telecommunications network that cover the most UE with the highest data value. In this way, the use of resources, such as 5G cells, are more efficiently utilized compared to placing resources where they are not needed and/or have limited use.

In some configurations, the metrics obtained from the UEs may also be used to generate, and provide a user interface (UI), such as a graphical UI that includes one or more of a visual representation of the network coverage and configuration data indicating to configure one or more components of a telecommunications network. Over time, the metrics collected by UEs may be utilized to generate a visualization of a density of UEs that utilize different types of cellular coverage.

According to some examples, UE within a telecommunications network may be utilized to collect data associated with network metrics. For instance, the metrics may indicate the type of wireless access coverage available to the UE, signal strengths between the UE and network transceiver(s), cell information (e.g., cell identifier, band name, bandwidth, . . . ), and the like. More specifically, in some examples, the metrics may include, but are not limited to signal strength of a signal between the UE and a network transceiver in the mobile device telecommunications network, a type of network that the user device is connected to (e.g., 5G, LTE, 3G, 2G, no network, etc.), a received signal strength (e.g., reference signal received power (RSRP), reference signal received quality (RSRQ), signal-to-interference-plus-noise ratio (SINR), received signal strength indicator (RSSI), energy per chip of the pilot channel over the noise power density (EcNo), etc.), LTE E-UTRAN cell identifier (ECI) (ENB-ID+CELLID), EN-DC capability of a cell (e.g., an LTE cell), list of 5G new radio (NR) cell information (e.g., communicated from an LTE primary cell (PCELL)), number of NR cells, NR cell ID, NR band name, NR bandwidth, LTE RRC state, NR RRC state, NR primary secondary cell (PSCell) physical cell id (PCI), NR PSCell band name, NR PSCell bandwidth, NR physical downlink shared channel (PDSCH) channel assignment status, NR PDSCH access status, NR PDSCH beam index, NR PSCell RSRP, NR PSCell SINR, NR PSCell RSRQ, NR channel quality indicator, NR rank indicator, list of synchronization signal block (SSB) signal information (e.g., SSB beam index, RSRP, RSSI, SINR, RSRQ, the band number, the bandwidth and the PCI of the 5G NR cell sending the beam), number of SSB beams detected by UE, SSB beam index, PCI for the cell that transmits the SSB name, band name, bandwidth, RSB RSSI, SINR, RSRQ, network type user interface (UI) indicator status, data transmission UI indicator, number of antenna bars on the UI indicator, user equipment location (e.g., via a user device-based global positioning system and/or Wi-Fi positioning system), and the like.

In some instances, the UE may be configured to collect data related to the metrics in response to a variety of triggers. Example triggers can include but are not limited to sending or receiving a voice call, an application-based trigger (e.g., launching a video-streaming application or some other type of application), an indication of signal loss as determined by the UE and/or by network devices, battery level thresholds, and the like. The UE may also collect the data on a periodic basis (e.g., hourly), and save the information to a local device memory. In some instances, a component of the telecommunications network (e.g., a server, service, . . . ) may collect metrics, such as coverage data as crowdsourced from multiple UE.

As briefly discussed, the system may also generate graphical output that represents information about the UE and connections to the telecommunications network. For instance, the system may generate a graphical map showing relative signal strength of varying colors and opacity that indicate call density and signal strengths. The visualization may also show the wireless access technologies being utilized in different areas of the map. For instance, the visualization may show where UE is located that utilizes (or could utilize) a particular wireless access technology (e.g., 5G). In some examples, the map may be part of data utilized to indicate one or more areas in which to add additional/different coverage, and/or be used to generate configuration data that may be used to configure one or more network resources. The graphic can also be used as a visualization tool to select high-value changes to the network infrastructure.

In some instances, a collection component used to capture data associated with metrics can be implemented as an application or component running on the UE, or a component of telecommunications network. The collection component may determine, based at least in part on the data, a coverage area associated with a network transceiver. The collection component can instruct the operating system component to control software and/or hardware associated with a transceiver of the user equipment to scan various channels in a frequency resource to determine metrics associated with the frequency resource. In some instances, the frequency resource can be outside of a frequency band or range used by the user equipment to conduct communications. The one or more metrics can be sent to the network device for aggregation and determination of one or more sources of diminished signal strength. Example sources may include an interference level (e.g., an existing interference level, an estimated interference level, etc.), for example, to determine whether to deploy a transmitter to a location, to deploy a network engineer to tune one or more transmitters to reduce the interference, and the like.

In some examples, the techniques discussed herein can be implemented on a user equipment configured to facilitate user communications using first frequency resources. In some instances, the first frequency resources can include, but are not limited to, an LTE Band 12 (e.g., a 700 MHz Band), an LTE Band 4 (e.g., 1700 MHz band and/or a 2100 MHz band), an LTE Band 2 (e.g., a 1900 MHz band), an LTE Band 66 (e.g., a 1700 MHz band and/or a 2100 MHz extended band), a UMTS Band 4, UMTS Band 2, GSM Band 2, 5G (e.g., 3.5 GHz-6 GHz, 28 GHz, etc.) and the like. Further, a collection component can be implemented as an application on the user equipment to intermittently scan second frequency resources. In some instances, the second frequency resources can be separate from the first frequency resources. For example, the second frequency resources can include, but are not limited to, an LTE Band 71 (e.g., a 600 MHz band), an LTE Band 48 (e.g., 3400 MHz), and the like. As can be understood, the first frequency resource and the second frequency resource can include any range of wireless frequencies capable of being used to communicate data. Thus, in general, the techniques can include the user equipment using the first frequency resources for communication(s) (e.g., voice communication, data communications, etc.), and can use the collection component to scan the second frequency resources, without using the second frequency resources for communication(s). However, in some instances, the techniques can include utilizing the second frequency resources for communication(s), while monitoring metrics associated with the resources to determine sources of interference, for example.

The systems, devices, and techniques described herein can be implemented in a number of ways. Example implementations are provided below with reference to the following figures.

FIG. 1 is a block diagram showing an illustrative environment that collects metrics 124 from user equipment, associated with a telecommunications network 118, that are utilized to generate configuration data utilized to configure network resources within a telecommunications network, as described herein.

In some instances, a user equipment (UE) 102, such as UE 102A, UE 102B, and UE 102C can include a collection component 104 and one or more transceiver(s) 106. In general, the user equipment 102 can receive a signal 108 output by a transmitter 110 to determine one or more metrics. In some instances, the user equipment 102 can receive signals, such as signal 108, from one or more transmitters 110 within the telecommunications network 118. UEs 102 may be configured to receive different signals. For example, UE 102B, and UE 102C may be configured to receive signals associated with 5G, 4G, and/or other wireless access technologies while other UEs 102, such as UE 102A may not be configured to receive 5G signals 108. In some instances, the transmitters 110, such as transmitter 110A and transmitter 110B, can represent any one-directional or two-directional wireless communication transceiver.

In some instances, the one or more transceiver(s) 106 can receive the signal 108 at the user equipment 102, and the collection component 104 can determine various metrics 124 associated with the signal 108. For example, the one or more metrics 124 can include, but are not limited to signal strength of a signal between the UE 102 and a network transceiver 106 in the mobile device telecommunications network, a type of network that the user device is connected to (e.g., 5G, LTE, 3G, 2G, no network, etc.), a received signal strength (e.g., reference signal received power (RSRP), reference signal received quality (RSRQ), signal-to-interference-plus-noise ratio (SINR), received signal strength indicator (RSSI), energy per chip of the pilot channel over the noise power density (EcNo), etc.), LTE E-UTRAN cell identifier (ECI) (ENB-ID+CELLID), EN-DC capability of a cell (e.g., an LTE cell), list of 5G new radio (NR) cell information (e.g., communicated from an LTE primary cell (PCELL)), number of NR cells, NR cell ID, NR band name, NR bandwidth, LTE RRC state, NR RRC state, NR primary secondary cell (PSCell) physical cell id (PCI), NR PSCell band name, NR PSCell bandwidth, NR physical downlink shared channel (PDSCH) channel assignment status, NR PDSCH access status, NR PDSCH beam index, NR PSCell RSRP, NR PSCell SINR, NR PSCell RSRQ, NR channel quality indicator, NR rank indicator, list of synchronization signal block (SSB) signal information (e.g., SSB beam index, RSRP, RSSI, SINR, RSRQ, the band number, the bandwidth and the PCI of the 5G NR cell sending the beam), number of SSB beams detected by UE, SSB beam index, PCI for the cell that transmits the SSB name, band name, bandwidth, RSB RSSI, SINR, RSRQ, network type user interface (UI) indicator status, data transmission UI indicator, number of antenna bars on the UI indicator, user equipment location (e.g., via a user device-based global positioning system and/or Wi-Fi positioning system), a channel identifier (e.g., channel 1, 2, . . . N (where N is an integer)) and/or an indication of a frequency associated with a channel (e.g., 617-622 MHz, 622-627 MHz, 627-632 MHz, . . . , 647-652 MHz), and the like. In some instances, the metrics 124 can be determined independently for a channel or for a block of frequencies.

As briefly discussed above, the UEs 102 may be configured to collect the data in response to a variety of triggers. The collection procedure may involve different steps. In some examples, the collection is triggered by an event, such as use of an application on the device. For instance, when a video application (or some other designated application) is started, the application may utilize a timer to collect the metrics 124 periodically while the application is in use (e.g., every 20, 40, 60 seconds, . . . ), until the application is stopped and/or or the screen of the UE 102 is turned off. Example triggers can include but are not limited to sending or receiving a voice call, an application-based trigger, an indication of a signal as determined by the UE and/or by network devices, battery level thresholds, and the like. The UEs 102 may also collect the data on a periodic basis (e.g., hourly), and save the information to a local device memory. In some instances, a component of the telecommunications network (e.g., a server, service, . . . ) may collect network metrics 124, such as coverage data as crowdsourced from multiple UE 102.

According to some examples, the UE 102, or some other device or component may utilize functionality provided by an Application Programming Interface (API) (not shown) to collect the data associated with the metrics 124. In some configurations, the API may include functions for determining metrics associated with different wireless access technologies (e.g., 4G, 5G, . . . ). For instance, the following are examples of a functions that may be exposed to obtain data associated with metrics. The function "getPdschBeamSignalCondition( )" may return RSRP, RSRQ, SINR. RSSI, . . . together with a timestamp. LTE ECI (ENB-ID+CELLID) may be used to obtain the globally unique cell identity in the context of PLMN. This metric may be used to retrieve additional cell information from a cell database on the network such as a location of the cell. EN-DC CAPABILITY OF THE LTE PCELL may be received from the serving cell and used to identify if the UE 102 is in LTE coverage where a 5G NR signal can be expected. Functions may also be exposed to obtain cell information, such as a list of 5G NR cell information communicated from an LTE PCELL. NR cell Information may include information such as NR cell ID, NR Band Name, and NR Bandwidth. The API format may be defined either to get the information for all the cells as a list or to get the information for one cell at a time with a parameter. For instance, as a list, if LTE PCell communicated to the UE 102 that there are 3 5G NR cells available for scan, then get5GNrCellInfoCommFromLtePcell( ) may return value [0]: "[NR Cell ID 1], [NR Band Name 1], [NR Bandwidth 1]" value[1]: "[NR Cell ID 2], [NR Band Name 2], [NR Bandwidth 2]" value[2]: "[NR Cell ID 3], [NR Band Name 3], [NR Bandwidth 3]". Obtaining the NR cell information may also be obtained one at a time with a parameter, such as get5GNrCellInfoCommFromLtePcell(integer sequenceNumber) where the sequenceNumber is the parameter for specifying a cell. In this example, get5GNrCellInfoCommFromLtePcell (0) returns "[NR Cell ID 1], [NR Band Name 1], [NR Bandwidth 1]", get5GNrCellInfoCommFromLtePcell (1) returns "[NR Cell ID 2], [NR Band Name 2], [NR Bandwidth 2]", get5GNrCellInfoCommFromLtePcell (2) returns "[NR Cell ID 3], [NR Band Name 3], [NR Bandwidth 3]", get5GNrCellInfoCommFromLtePcell (3) returns "na, na, na, na". API calls may also be made to obtain other metrics, such as the metrics described herein.

As a particular example for purposes of explanation, during the collection of data associated with metrics 124, the UE 102 may determine EN-DC capability of an LTE PCell to identify if the UE 102 is in the potential coverage for a wireless access technology (e.g., 5G). Generally, the EN-DC capability of the LTE PCell indicates whether an LTE cell can work with a 5G cell to serve an EN-DC capable device or not. For example, if the return value is 'true', there is a chance for 5G connection. If the return value is 'na', that indicates there is not a chance for a 5G connection. If the LTE PCell is EN-DC capable, the device is in an area as illustrated by dashed line 118. If the LTE PCell is not EN-DC capable, then 118 would not include transmitter 110A.

If the LTE PCell is EN-DC capable, the UE 102 may be utilizing the 5G NR band for data transmission. To verify this, the RRC state may be checked on both 4G LTE and on 5G NR. The UE 102 may use an API to collect LTE RRC state (e.g., IDLE, CONNECTED) and NR RRC state (e.g., IDLE, CONNECTED) to determine if there is a possibility of any data transmission using the different wireless access technologies for the UE 102. If LTE RRC is not in CONNECTED state, there is not a chance for data transmission and NR RRC state cannot be CONNECTED either (no data transmission over 5G NR). If LTE RRC is in the CONNECTED state, then the NR RRC state may be CONNECTED indicating possible data transmission over 5G NR, or IDLE indicating data transmission over LTE but not over 5G NR.

As an example, UE 102A is depicted as being in the LTE coverage of transmitter 110B but not in the 5G NR coverage provided by transmitter 110A. UE 102B and UE 102C are illustrated as being in 5G NR coverage and within the LTE coverage.

When a UE 102 indicates that it has connection to 5G NR, then the UE 102 may obtain data indicating the condition of the 5G NR connection. For example, the UE 102 may utilize the API to collect data for NR PSCell band name, NR PSCell bandwidth, NR physical downlink shared channel (PDSCH) channel assignment status, NR PDSCH access status, NR PDSCH beam index, NR PSCell RSRP, NR PSCell SINR, NR PSCell RSRQ, NR channel quality indicator, NR rank indicator, and the like. The UE 102 may also collect information that checks the condition of the 5G NR signals for potential data transmission, such as a list of synchronization signal block (SSB) signal information (e.g., SSB beam index, RSRP, RSSI, SINR, RSRQ, the band number, the bandwidth and the PCI of the 5G NR cell sending the beam), number of SSB beams detected by UE, SSB beam index, PCI for the cell that transmits the SSB name, band name, bandwidth, RSB RSSI, SINR, RSRQ, and the like.

Regardless of the NR RRC state, the UE 102 may detect one or multiple SSB beams from 5G cells. By analyzing the conditions of the SSB beams detected by the UE 102, the 5G coverage for the device location may be determined. As another example, the UE 102 may collect data from the screen of the UE 102. In some examples, the UE 102 collects information that identifies the network status of the device (e.g., number of bars indicating strength, the network connected to, . . . ). While a particular example has been illustrated, the techniques described herein may be utilized with other different wireless access technologies.

In some examples, the network device(s) 112 are configured to generate configuration data that identifies first utilization data that indicates a first utilization of a first wireless access technology (e.g., 5G, 4G, . . . ) within a first geographic area of the telecommunications network and other utilization data that indicates one or more other utilizations of different wireless access technologies within one or more other geographic areas of the telecommunications network. The configuration data generated by the configuration component 120 may identify one or more locations within one or more of the geographic areas to configure one or more network resources of the telecommunications network. The configuration data may also be utilized to cause one or more actions to occur within the telecommunications network to configure one or more network resources.

According to some configurations, the network coverage component 116 may generate a UI and/or graphical output, such as visualization 126A and visualization 126B, that represents information about the UEs 102 and connections to the telecommunications network 118. For instance, the network coverage component 116 may generate visualization 126A that is a graphical map showing different areas that are covered by one or more wireless access technologies. As illustrated, the visualization 126A graphically displays locations of areas in the United States that have devices utilizing 5G wireless access technologies.

The network device(s) 112 may also be configured to provide other data and/or visualizations relating to network coverage. For example, the network coverage component 116 and/or the configuration component 120 may provide visualization 126B that illustrates more details regarding what wireless access technologies are utilized by different regions/markets. For example, visualization 126B illustrates the utilization of two different wireless access technologies as bar graphs for ten regions/markets. See FIG. 2 for more details regarding visualization 126A and visualization 126B.

In some examples, the visualization 126A and/or visualization 126B may be part of a configuration provided by configuration component 120 that may indicate one or more areas in which to add additional/different coverage, and/or be used to generate a configuration. The visualization 126 can also be used as a tool to select high-value changes to the network infrastructure.

In some instances, a collection component 104 can be implemented as an application or component running on the UE 102, or a component of telecommunications network 118. The collection component 104 may determine, based at least in part on the data, a coverage area associated with the network transceiver. The collection component 104 can instruct an operating system component to control software and/or hardware associated with a transceiver of the UE 102 to scan various channels in a frequency resource to determine metrics associated with the frequency resource. In some instances, the frequency resource can be outside of a frequency band or range used by the user equipment to conduct communications.

The user equipment 102 can communicate with one or more network device(s) 112 via one or more network(s) 114. For example, the transceiver(s) 106 of the user equipment 102 may transmit one or more metrics 124 to the one or more network device(s) 112, where the metrics 124 include various data associated with the telecommunications network utilizing different wireless access technologies.

FIG. 1 illustrates the user equipment 102 capturing metrics 124 associated with the transmitter 110A and transmitter 110B, as described herein. Many more UEs 102 and/or transmitters 110, however, may be utilized. In some instances, the user equipment 102 can receive the signal 108 output by the transmitter 110A and can determine the metrics 124 associated with the signal 108. The user equipment 102 may also receive a signal 108 output by the transmitter 110B (not shown) and can determine the metrics 124 associated with the signal 108 from the transmitter 1101B. As illustrated, the metrics 124 associated with the signal 108 can include information indicative of signal strength of the signal 108 as it is received at the user equipment 102, location of the user equipment 102, and other information. For example, the metrics 124 depicted in FIG. 1 may include network 1 metrics 124A that are associated with a first wireless access technology (e.g., 4G, . . . ), network 2 metrics 124B that are associated with a second wireless access technology (e.g., 5G, . . . ), a network type 124C metric, a location 124D metric, and other metrics such as discussed herein. The metrics 124, and particularly, the example information included in the metrics 124 as depicted in FIG. 1, are only examples and not meant to be limiting.

In some instances, the network device(s) 112 can include a network coverage component 116 that can receive the one or more metrics 124 from the UE 102, as well as other user equipment, and aggregate the metrics 124 that are utilized to generate a visualization 126 and/or one or more configuration(s) 122. In some instances discussed herein, the visualization 126 can be used, at least in part, to determine and/or indicate locations of transmitters 110 that are active and that are being accessed by UE 102 within the area of coverage, to determine locations where to deploy base stations or other network devices 112, to determine and/or indicate locations having and not having signal strength that meets or exceeds a signal strength threshold, to determine and/or indicate locations where a device activity density associated with the location meets or exceeds a device activity density threshold, to determine and/or indicate locations where a network signal is associated with poor quality, and to inform decisions regarding optimization of wireless transmissions, among other functions.

For example, the configuration component 120 may be configured to determine whether or not UE 102 within a particular geographic area support a wireless access technology (e.g., 4G, 4G LTE, 5G, . . . ), determine what wireless access technologies are utilized by the UEs 102, generate a visualization of the coverage, and provide configuration(s) 122 relating to the wireless telecommunications network. The configuration component 120 may utilize the metrics 124, and generate the one or more configuration(s) 122, which may include information indicating to change coverage of a particular wireless access technology (e.g., add 5G capability, place transmitter(s) 110 in certain locations, update a hardware component, and the like. As can be understood, the network coverage component 116 and the configuration component 120 are not limited to outputting the visualization 118 and the configuration(s) 122, and any number of visualizations, configuration(s), or data can be utilized, as discussed herein.

Examples of the user equipment 102 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the user equipment 102 can include, but are not limited to, smart devices such as televisions, refrigerators, washing machines, dryers, smart mirrors, coffee machines, lights, lamps, temperature sensors, music players, headphones, or any other electronic appliances that can generate, request, receive, transmit, or exchange voice, video, and/or digital data over a network.

In some instances, the network device(s) 112 can be implemented as one or more communication servers to facilitate communications by and between the various devices in the environment 100. That is, the network device(s) 112 can represent any computing devices implementing various aspects of one or more of second, third, fourth, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies, Universal Mobile Telecommunications System (UMTS) is an example of 3G telecommunications technologies, Long Term Evolution (LTE), including LTE Advanced, and Evolved High-Speed Packet Access (HSPA+) are examples of 4G telecommunications technologies, and New Radio (NR) is an example of 5G telecommunication technologies. Thus, the network device(s) 112 may implement GSM, UMTS, LTE/ LTE, and/or NR Advanced telecommunications technologies.

The network device(s) 112 may include, but is not limited to, a combination of: base transceiver stations BTSs (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user equipment 102, the network device(s) 112, and/or the network(s) 114. In some examples, the network device(s) 112 may be operated by a service provider. While FIG. 1 illustrates the network device(s) 112, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

Examples of the network(s) 114 can include but are not limited to networks including second-generation (2G), third-generation (3G), fourth-generation (4G), or fifth-generation (5G) cellular networks, such as NR (New Radio), LTE (Long Term Evolution), and data networks, such as Wi-Fi networks.

In some instances, the user equipment 102 can communicate with any number of user equipment, servers, network devices, computing devices, and the like. Further, in some instances, the user equipment 102 can send the metrics 124 to a network device (such as the network device(s) 112) for aggregation and processing. In some instances, the user equipment 102 can monitor the signal 108 without utilizing the frequency resources associated with the signal for communication(s). That is, the user equipment 102 can communicate with other devices using a separate base station or wireless transceiver, not illustrated in FIG. 1.

Figure 2:
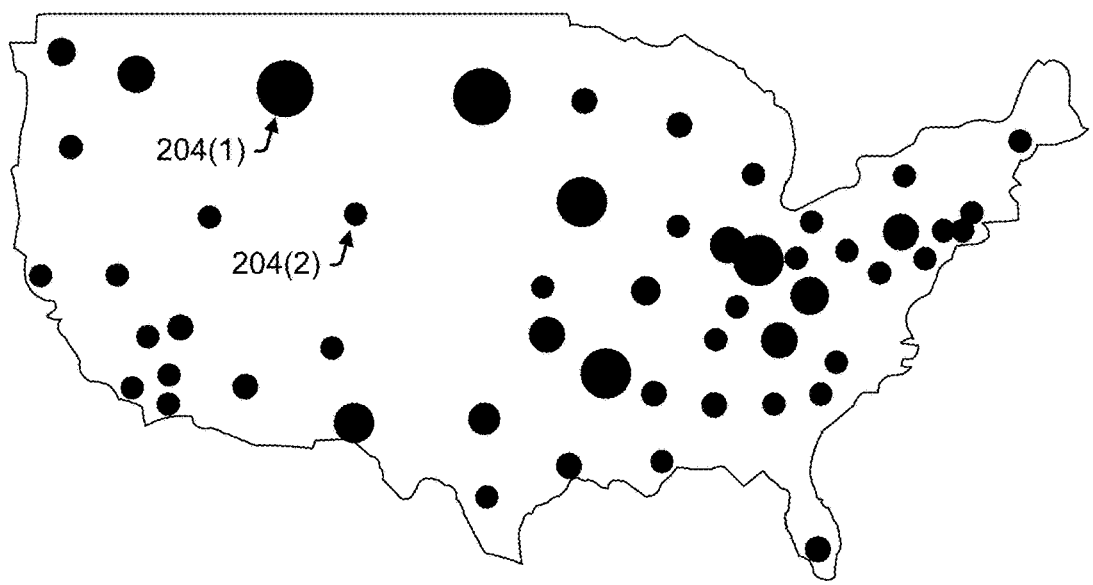
FIG. 2 illustrates example visualizations of network coverage.
Figure 2:
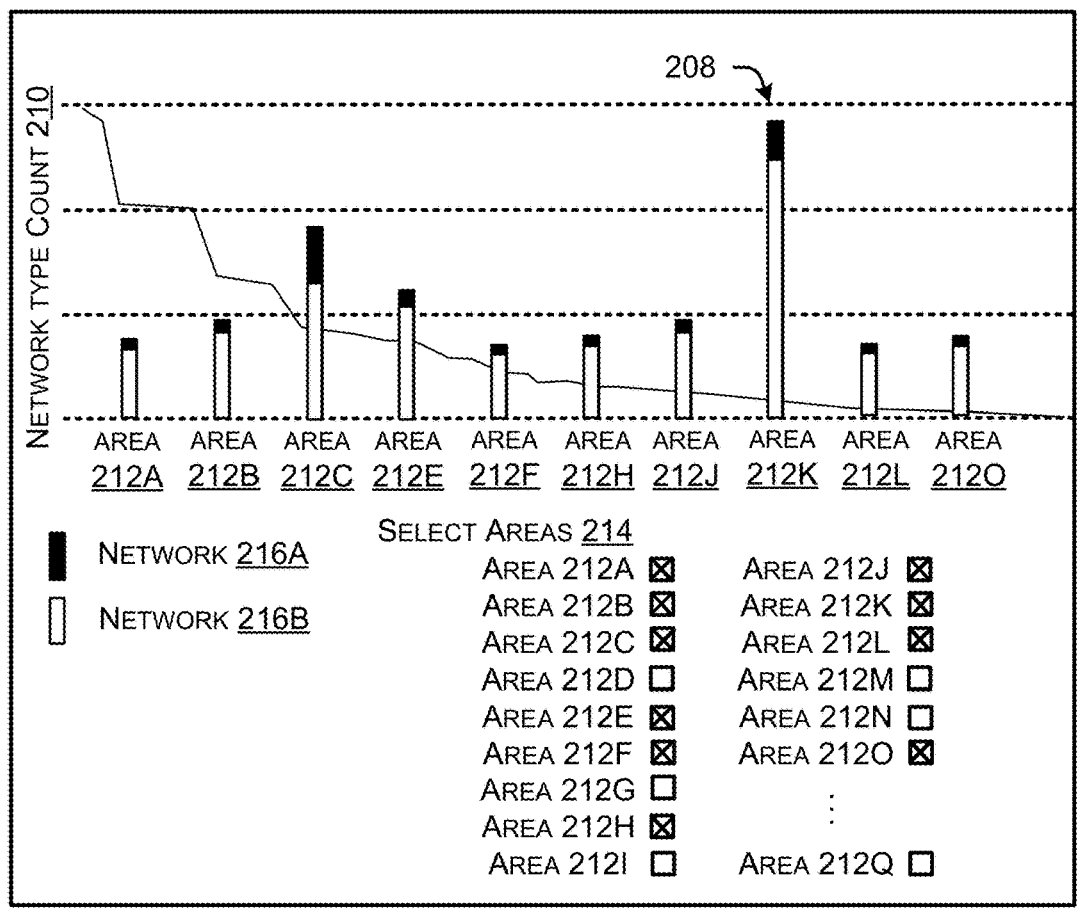

FIG. 2 illustrates example visualizations of network coverage. As discussed above, one or more of the network device(s) 112, or some other device or component may be configured to generate graphical output, such as visualization 202 and visualization 206, that represents information about the UEs 102 and connections to the telecommunications network 118.

For instance, the network coverage component 116 may generate geographic visualization 202 that illustrates an area (e.g., a region, an area, a country, a state, a county, . . . ) that shows different areas that are covered by one or more wireless access technologies. As illustrated, the visualization 202 graphically displays locations of areas in the United States that have devices utilizing 5G wireless access technologies. By referring to visualization 202, a user can readily determine what areas of the country are utilizing a particular wireless access technology (e.g., 4G, 5G, . . . ). In the current example, the black circles represent areas of the US that include UE 102 accessing a particular wireless access technology (e.g., 5G). The larger the size of the black circle indicates more UE 102 utilizing the wireless access technology. For instance, circle 204(1) indicates that more UE 102 are utilizing 5G as compared to circle 204(2) that is smaller in size and that is associated with fewer UE 102.

The network device(s) 112, or some other device or component, may also be configured to provide other visualizations relating to network coverage. For example, the network coverage component 116 and/or the configuration component may provide graph visualization 206 that illustrates more details regarding what wireless access technologies are utilized by different areas/regions/markets. For example, visualization 126 illustrates the utilization of two different wireless access technologies (e.g., 4G and 5G) as bar graphs, such as bar graph 208, for ten regions/markets (area 212A, 212B, 212C, 212E, 212F, 212H, 212J, 212K, 212L, and 212O). In the current example, the bar graph illustrates a network type count 210 for a first network 216A (e.g., 5G), and a second network 216B (e.g., 4G). In some configurations, a user may select the areas to display using one or more user interface (UI) elements, such as the select areas 214 UI elements.

Figure 3:
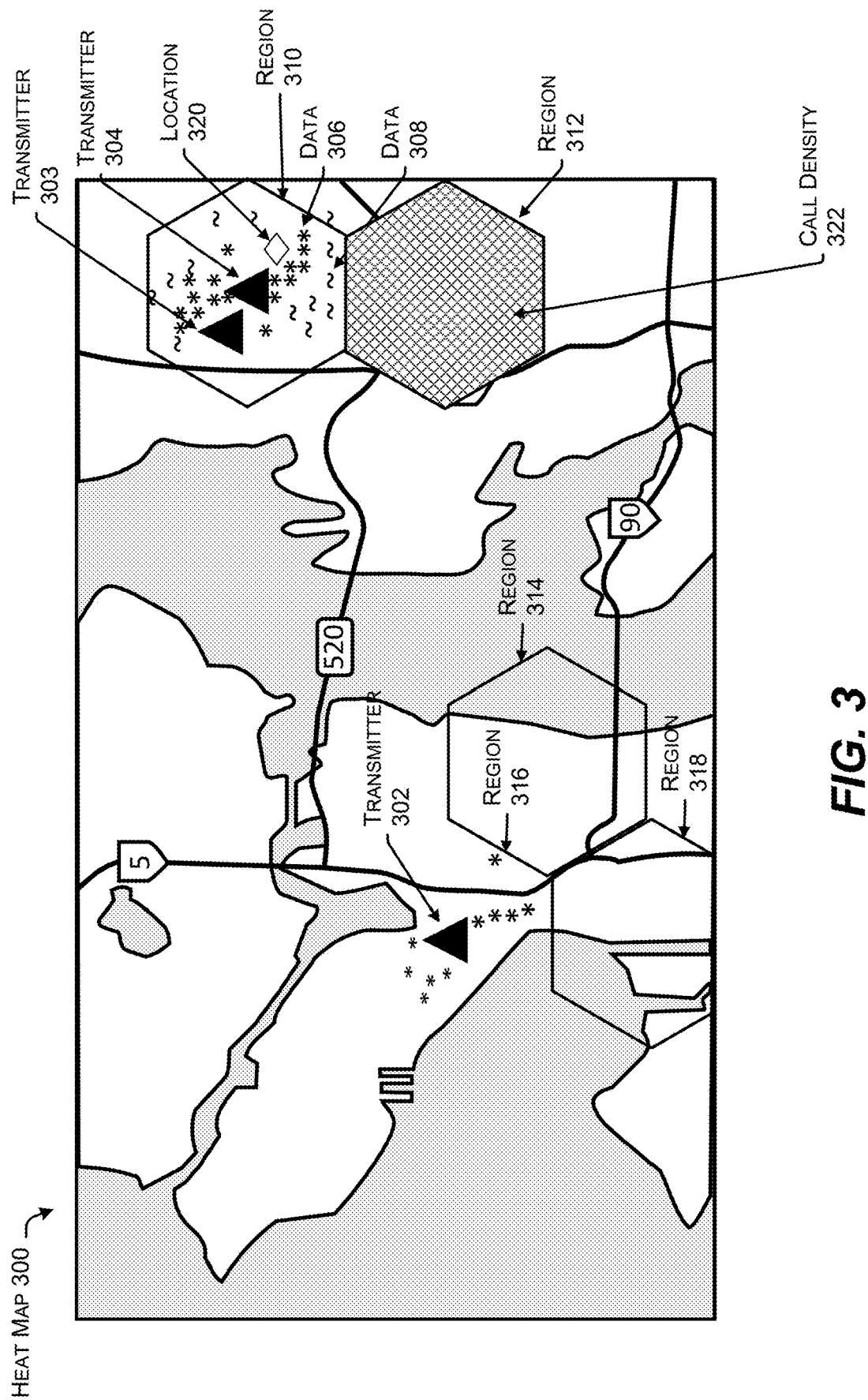
FIG. 3 illustrates an example heat map indicating network coverage.

FIG. 3 illustrates an example heat map 300 indicating network coverage, As illustrated, the heat map 300 can represent various transmitters 302, 303, and 304 in an environment. Further, the heat map 300 can represent various data 306 and 308, which can correspond to aggregated data and/or individual metrics collected by user equipment, as discussed herein. The heat map 300 can also represent various locations bounded by geographic regions, which are depicted as regions 310, 312, 314, 316, and 318. One or more locations 320 may be included in the heat map 300, which may be a sub-region, a building, a set of buildings, etc. The data 306 and 308 may include data comprising one or more metrics, as discussed herein, such as network type, etc., as determined by the UE 102. For example, use of a particular wireless access technology (e.g., 4G) can be represented as the data 306, corresponding to the symbol "*". The metrics 124 (FIG. 1) may be one example of the data 306 and 308. In some examples, a different wireless access technology (e.g., 5G) can be represented as the data 308, corresponding to the symbol "~".

Of course, any indications (e.g., color, size, shape, labels, etc.) can be used to distinguish between various metrics. The heat map 300 may also include an indication of device activity density for one or more of the regions 310-318. For example, the region 312 depicts a device activity density 322, which is depicted as a hatch pattern within the region 312. Although not shown in FIG. 3, a device activity density may be associated with any or all of the regions 310-318. Although only 5 regions are depicted, it should be appreciated that any number of regions may be included in the heat map 300.

In some instances, the heat map 300 can be used, at least in part, to determine one or more configurations (e.g., the configuration(s) 122 in FIG. 1). The configuration(s) 122 may include one or more suggested locations where active transmitters (e.g., the transmitter 302, 303, or 304) are located, what type of transmitters to deploy (e.g., 4G, 5G, . . . ), where user equipment experience interference, weak or strong signal strength, etc., and/or where to deploy additional base stations, for example. In other instances, the size, shape, location, call density, or other information associated with the regions 310-318 may be used to determine one or more configurations for augmenting the infrastructure of the telecommunications network.

In some instances, the heat map 300 may include a geographic region associated with the network transceiver, where the geographic region is output having a color associated with the coverage area. The color may be indicative of the number of UE 102 utilizing a particular wireless access technology, an aggregated signal strength associated with the network transceiver, and the like. In other aspects, the geographic region may be output having a pattern representative of the aggregated signal strength, and/or an opacity associated with the aggregated signal strength, and/or call density.

In some instances, the heat map 300 can be generated by the network coverage components 116, as discussed herein. Of course, the example visualizations are not limited to the heat map 300. Further, the transmitters 302, 303, and 304 are not limited to transmitters and include any transceivers and/or base stations.

Figure 4:
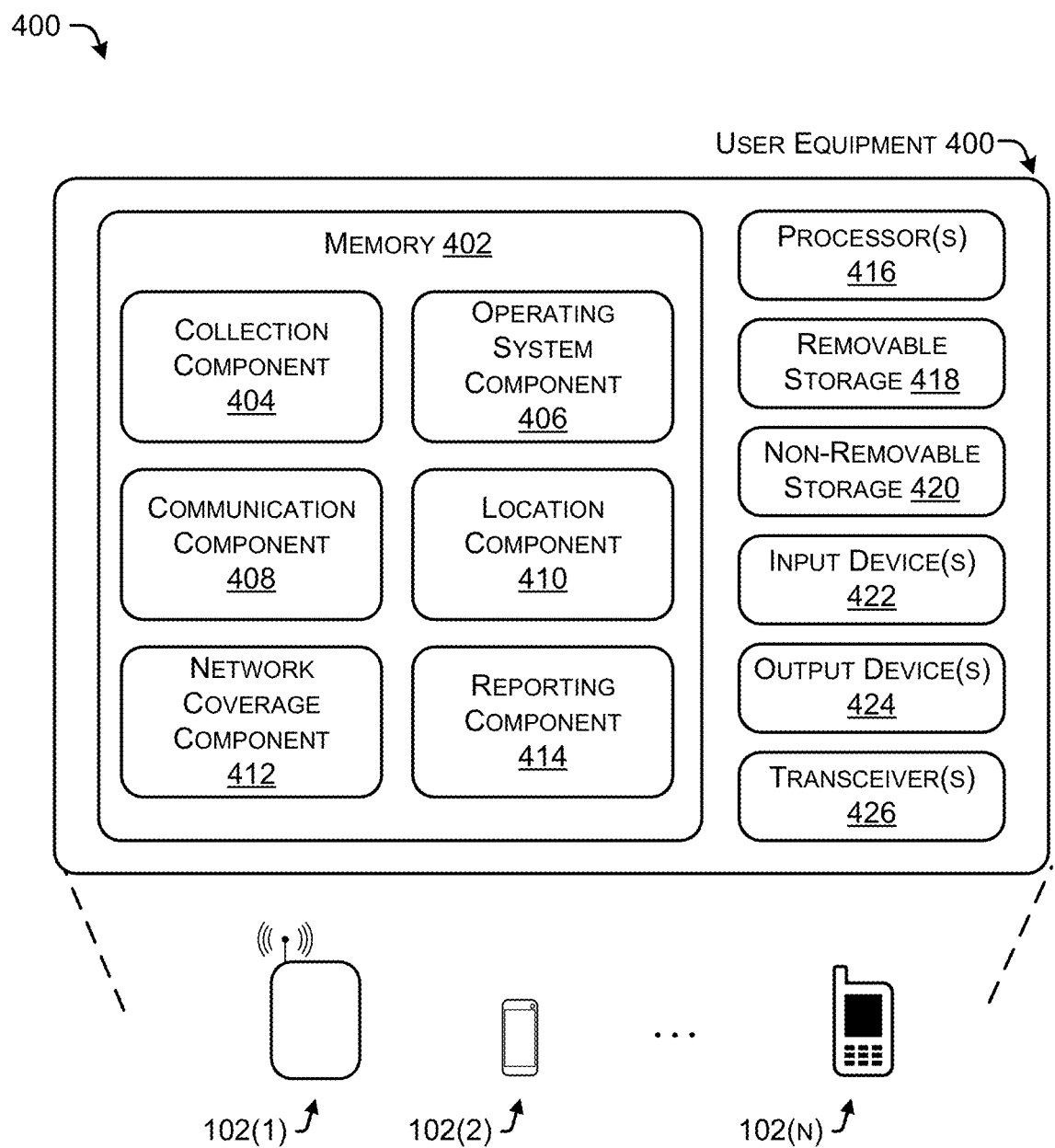
FIG. 4 is a block diagram illustrating an example user equipment capturing metrics.

FIG. 4 illustrates an example user equipment 400 configured to implement the collection component, in accordance with examples of the disclosure. In some examples, the user equipment 400 can correspond to the user equipment 102 of FIG. 1. It is to be understood in the context of this disclosure that the user equipment 400 can be implemented as a single device or as a plurality of devices with components and data distributed among them. By way of example, and without limitation, the user equipment 400 can be implemented as various user equipment 102(1), 102(2), . . . , 102(N).

As illustrated, the user equipment 400 comprises a memory 402 storing a collection component 404, an operating system component 406, a communication component 408, a location component 410, a network coverage component 412, and a reporting component 414. Also, the user equipment 400 may include processor(s) 416, a removable storage 418 and non-removable storage 420, input device(s) 422, output device(s) 424, and transceiver(s) 426.

In various examples, memory 402 is volatile (such as RAM), non-volatile (such as ROM, flash memory, etc.) or some combination of the two. The collection component 404, the operating system component 406, the communication component 408, the location component 410, the network coverage component 412, and the reporting component 414 stored in the memory 402 can comprise methods, threads, processes, applications or any other sort of executable instructions. The collection component 404, the operating system component 406, the communication component 408, the location component 410, the network coverage component 412, and the reporting component 414 can also include files and databases.

In some instances, the collection component 404 can correspond to the collection component 104 of FIG. 1. The collection component 404 can include functionality to determine one or more metrics 124 associated with a signal received, detected, or otherwise monitored by the user equipment 400. For example, the collection component 404 can determine metrics including but not limited to network coverage, network types, and the like as discussed herein. In some instances, information can be associated with the metrics, such as a band number, channel number, block identifier, and the like.

In some instances, the collection component 404 can scan a frequency resource at any regular or irregular interval or can initiate a scan based on an internal or external trigger or command. For example, the collection component 404 can receive an instruction from a remote network device to initiate a scan. In some instances, the collection component can determine operating conditions or characteristics of the user equipment 400 (e.g., a power resource, location, etc.), and a command to initiate scanning can be based at least in part on those operating conditions or characteristics. In some instances, the collection component 404 can include previously-collected measurements. According to some examples, the collection component 404 can sample conditions of a signal over a period of time and perform a statistical analysis to determine additional metrics (e.g., average, median, high, low, etc.) associated with the signal.

In some configurations, the collection component 404 can be implemented as an application operating on the user equipment 400. According to some configurations, to initiate a scan of one or more frequency resources, the collection component 404 can call an application programming interface (API) implemented in the operating system component 406.

According to some examples, the collection component 404 can include functionality to present a user interface on the user equipment 400, for example, to receive an indication from a user enabling or disabling a collection component mode of the collection component 404. For example, in some instances, a user of the user equipment can turn on or turn off the collection component 404 based on personal preferences, incentives from a service provider, inclusion in a voluntary program, and the like.

The operating system component 406 can include functionality to query a chipset of the user equipment 400, and/or to query the transceiver(s) 426, to instruct the transceiver(s) 426 and/or any software or hardware to scan one or more channels or frequency resources to determine metrics associated with the channel or frequency resources, for example. In some instances, the operating system component 406 can include a first API to receive instructions from the collection component 404 and to provide data to the collection component 404, and a second API to issue instructions to software or hardware associated with a modem or the transceiver(s) 426 and to receive data from such components.

The communication component 408 can include functionality to conduct communications with one or more other devices, as discussed herein. In some instances, the communication component 408 can conduct a communication via a first set of frequency resources, while the collection component 404 can analyze a second set of frequency resources. In some instances, at least a portion of the first set and the second set of frequency resources can be overlapping, and in some instances, the first set and the second set of frequency resources can be independent.

According to some examples, the communication component 408 can take priority over resources of the user equipment 400 to conduct a communication. That is, if the collection component 404 initiates a scan of a frequency resource, and if the communication component 408 subsequently initiates a communication using the frequency resource or another frequency resource, the communication component 408 can initiate the communication by interrupting the collection component 404. Other prioritization schemes may be used, and the communication component 408 can have any relative or absolute priority level.

The location component 410 can include functionality to determine a location of the user equipment 400. In some instances, the location component 410 can determine a location based at least in part on GPS location data, base station identity, Wi-Fi access point identity, or a combination of location sources. In some examples, a location can include a mobile network code (MNC) and a mobile country code (MCC) used in combination to uniquely identify a mobile network carrier network. In some examples, the location component 410 can determine a base station or cell identity, and/or latitude, longitude, altitude information, and timestamp information. In some instances, the location can be determined in connection with determining one or more metrics associated with a signal or channel. In some instances, the location can be provided to a network device, for example, for aggregation and analysis. In some instances, the location component 410 can determine a location of the user equipment 400 relative to a location of a geofenced location. For example, the location component 410 can receive a geofenced location from a network device.

The network coverage component 412 may include functionality to aggregate data associated with the user equipment 400, including one or more of the metrics 124 discussed with respect to FIG. 1. For example, the network coverage component 412 may evaluate RSSI, RSRP, MCC, MNC, network type information, location information received from the location component 410, time and/or date information, etc., and save the metrics 124 to the removable storage 418 and/or the non-removable storage 420.

One or more triggering events may cause the user equipment 400 to transmit the data by retrieving the metrics from the removable storage 418 and/or the non-removable storage 420 and transmitting the data via the transceiver(s) 426 to the network device(s) 112.

The reporting component 414 can include functionality to store one or more metrics 124 associated with one or more frequency resources and to send such metrics to a network device. In some instances, the reporting component 414 can send the one or more metrics to a network device as the one or more metrics are generated, captured, or determined. In some instances, the reporting component 414 can send the metrics to the network device. In some instances, the reporting component 414 can send the metrics based on a connection type of the user equipment 400 (e.g., when the user equipment 400 is connected to a Wi-Fi network). In some instances, the reporting component 414 can send the metrics at a time of low network congestion (e.g., at night). In some instances, the reporting component 414 can transmit metrics in response to a query from a network device, for example. In some instances, the reporting component 414 can encode the data sent to a network device such that a service provider tracking data usage does not count the data against a quota associated with the user equipment 400.

In some examples, the processor(s) 416 is a central processing unit (CPU), a graphics processing unit (GPU), or both CPU and GPU, or other processing unit or component known in the art.

The user equipment 400 also includes additional data storage devices (removable and/or non-removable) such as, for example, magnetic disks, optical disks, or tape. Such additional storage is illustrated in FIG. 4 by removable storage 418 and non-removable storage 420. Tangible computer-readable media can include volatile and non-volatile, removable and non-removable media implemented in any method or technology for storage of information, such as computer readable instructions, data structures, program modules, or other data. Memory 402, removable storage 418 and non-removable storage 420 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 400. Any such tangible computer-readable media can be part of the user equipment 400.

In various examples, the user equipment 400 can include applications including but are not limited, a web browser application, a video streaming application, an online gaming application, a collection component, and the like. During execution on the user equipment 400, each of the applications may be configured to cause the user equipment 400 to initiate data communications with the network device(s) 112 over the network(s) 114.

The user equipment 400 may be configured to communicate over a telecommunications network using any common wireless and/or wired network access technology. Moreover, the user equipment 102 may be configured to run any compatible device operating system (OS).

The user equipment 400 also can include input device(s) 422, such as a keypad, a cursor control, a touch-sensitive display, voice input device, etc., and output device(s) 424 such as a display, speakers, printers, etc. These devices are well known in the art and need not be discussed at length here.

As illustrated in FIG. 4, the user equipment 400 also includes one or more wired or wireless transceiver(s) 426. For example, the transceiver(s) 426 can include a network interface card (NIC), a network adapter, a LAN adapter, or a physical, virtual, or logical address to connect to various network(s) 114, or to the network device(s) 112, for example. To increase throughput when exchanging wireless data, the transceiver(s) 426 can utilize multiple-input/multiple-output (MIMO) technology. The transceiver(s) 426 can comprise any sort of wireless transceivers capable of engaging in wireless, radio frequency (RF) communication. The transceiver(s) 426 can also include other wireless modems, such as a modem for engaging in Wi-Fi, WiMax, Bluetooth, infrared communication, and the like. In some instances, the transceiver(s) 426 can correspond to the transceiver(s) 106 of FIG. 1.

Figure 5:
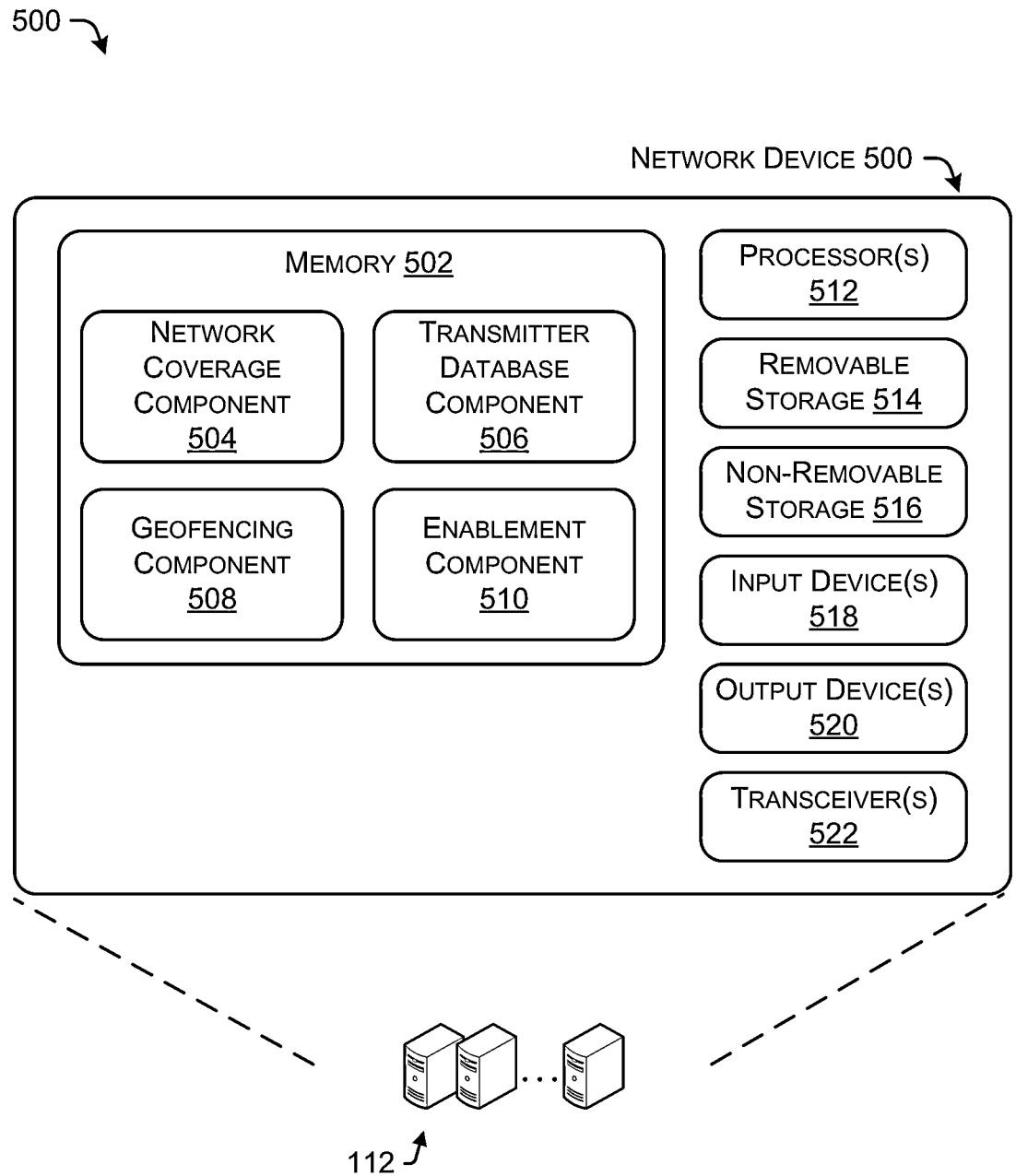
FIG. 5 is a block diagram illustrating an example network device receiving network metrics captured by user equipment.

FIG. 5 illustrates an example network device 500 configured to receive metrics captured by user equipment, in accordance with examples of the disclosure. In some examples, the network device 500 can correspond to the network device(s) 112 of FIG. 1. It is to be understood in the context of this disclosure that the network device 500 can be implemented as a single device or as a plurality of devices with components and data distributed among them.

As illustrated, the network device 500 comprises a memory 502 storing a network coverage component 504, a transmitter database component 506, a geofencing component 508, and an enablement component 510. Also, the network device 500 includes processor(s) 512, a removable storage 514 and non-removable storage 516, input device(s) 518, output device(s) 520, and transceiver(s) 522.

In various examples, the memory 502 is volatile (such as RAM), non-volatile (such as ROM, flash memory, etc.) or some combination of the two. The network coverage component 504, the transmitter database component 506, the geofencing component 508, and the enablement component 510 stored in the memory 502 can comprise methods, threads, processes, applications or any other sort of executable instructions. The network coverage component 504, the transmitter database component 506, the geofencing component 508, and the enablement component 510 can also include files and databases.

The network coverage component 504 can include functionality to receive one or more metrics 124 determined and/or captured by user equipment, as discussed herein. In some instances, the network coverage component 504 can receive a plurality of metrics and store the metrics in a database. In some instances, the metrics can be indexed by location, time, user equipment, and the like. In some instances, the network coverage component 504 can perform any statistical analysis on the metrics 124 to determine a variety of characteristics associated with the telecommunications network. For example, the network coverage component 504 can determine what wireless access technologies are accessed, what the capability is of the UEs 102 operating within the telecommunications network, strengths of signals, coverage areas associated with different wireless access technologies, and the like. In some examples, the network coverage component 504 can correspond to the network coverage component 116 of FIG. 1.

The transmitter database component 506 can store locations of transmitters 110 and/or base stations in a database. Further, the transmitter database component 506 can receive location data and/or metrics associated with a signal to determine which transmitter 110 corresponds to the metrics. In some instances, the transmitter database component 506 can determine a confidence value associated with the identity of a transmitter or base station.

The geofencing component 508 can include functionality to determine areas in which analysis should be performed. For example, the geofencing component 508 can determine areas around a legacy transmitter (e.g., a TV antenna) where metrics are to be determined. In some instances, the geofencing component 508 can determine areas where network resources (e.g., new base stations) are to be deployed to confirm signal status in that area. In some instances, the geofencing component 508 can determine areas where signal characteristics are known such that the spectrum analysis is not needed. In some instances, the geofencing component 508 can send indications of the geofenced locations to one or more user equipment to collect metrics, as discussed herein.

The enablement component 510 can include functionality to send invitations to various user equipment to determine if users of the user equipment wish to activate the collection component, as discussed herein. In some instances, the enablement component 510 can enable the collection component for individual user equipment based at least in part on characteristics of the user component, such as whether an antenna of the user equipment is configured to receive signals associated with particular frequency resources. In further examples, the enablement component 510 can provide an instruction or indication to conduct drive-testing in an area based at least in part on metrics obtained by user equipment, as discussed herein.

In some examples, the processor(s) 512 is a central processing unit (CPU), a graphics processing unit (GPU), or both CPU and GPU, or other processing unit or component known in the art.

The network device 500 also includes additional data storage devices (removable and/or non-removable) such as, for example, magnetic disks, optical disks, or tape. Such additional storage is illustrated in FIG. 5 by removable storage 514 and non-removable storage 516. Tangible computer-readable media can include volatile and nonvolatile, removable and non-removable media implemented in any method or technology for storage of information, such as computer readable instructions, data structures, program modules, or other data. Memory 502, removable storage 514 and non-removable storage 516 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the network device 500. Any such tangible computer-readable media can be part of the network device 500.

The network device 500 can include input device(s) 518, such as a keypad, a cursor control, a touch-sensitive display, etc. Also, the network device 500 can include output device(s) 520, such as a display, speakers, etc. These devices are well known in the art and need not be discussed at length here.

As illustrated in FIG. 5, the network device 500 can include one or more wired or wireless transceiver(s) 522. In some wireless examples, to increase throughput, the transceiver(s) 522 can utilize multiple-input/multiple-output (MIMO) technology. The transceiver(s) 522 can be any sort of wireless transceivers capable of engaging in wireless, radio frequency (RF) communication. The transceiver(s) 522 can also include other wireless modems, such as a modem for engaging in Wi-Fi, WiMax, Bluetooth, infrared communication, or the like.

Figure 6:
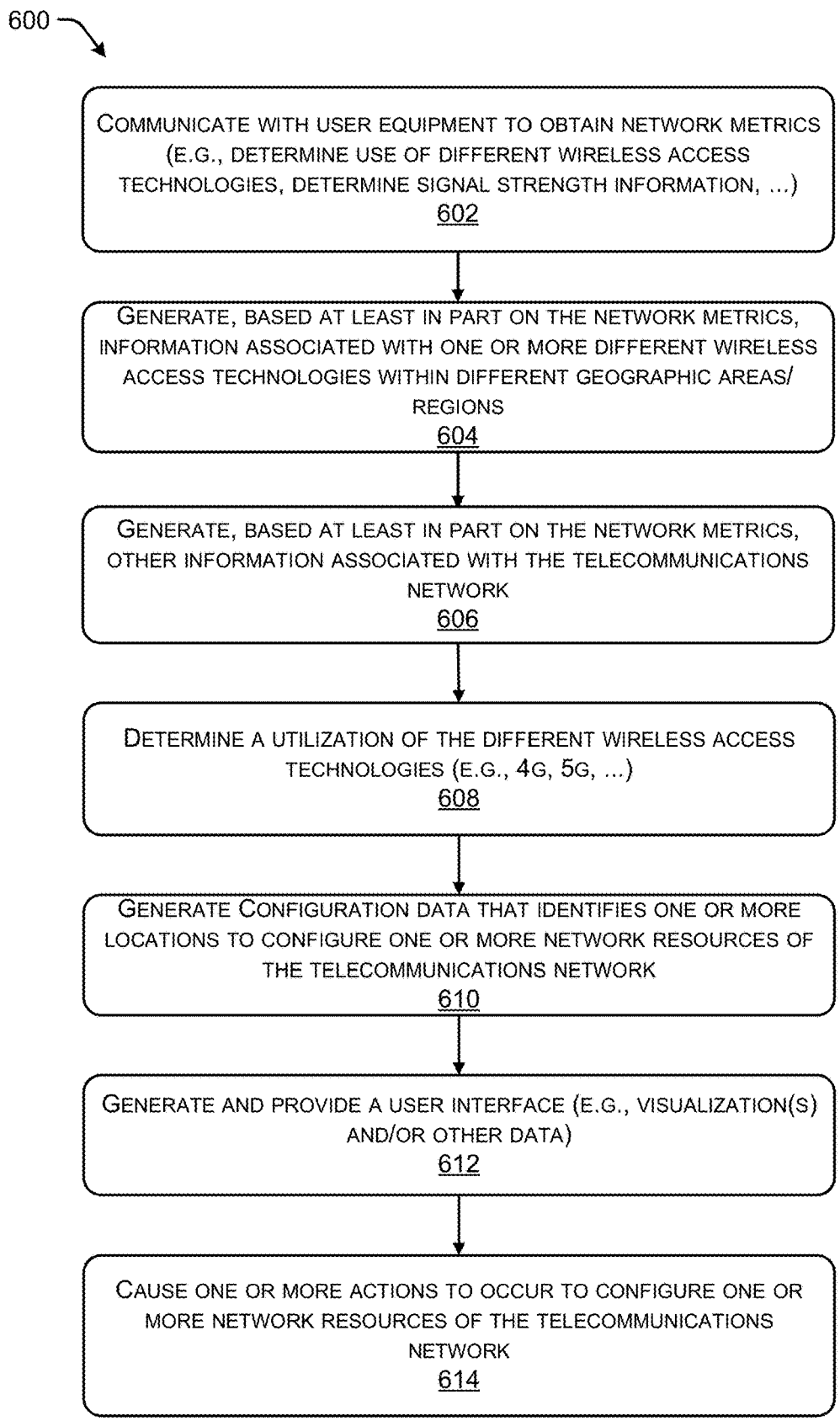
FIG. 6 is a flow diagram of an example process that includes generating configuration data to configure network resources of a telecommunications network.

FIG. 6 illustrates an example process that includes generating configuration data to configure network resources of a telecommunications network. This process is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

At 602, the one or more processor(s) 512 may communicate with the user equipment 400 to obtain data associated with metrics 124. As discussed above, the metrics 124 may include data obtained from an interaction between transmitters 110 and UEs 102 in the mobile device telecommunications network (e.g., the environment 100, as depicted in FIG. 1).

The user equipment 112 may transmit the data based at least in part on one or more triggering events. For example, data associated with one or more of the metrics 124 may be sent based at least in part on a user launch of a media application using the user equipment 112. In some configurations, launching a particular application may be a triggering event, where opening that application, without regard to the signal status (connected to the network, not connected to the network, threshold RSSI values, RSRP values, etc.).

The metric data 124 may be transmitted from a multitude of user equipment (of which the user equipment 102 may be a part) can be aggregated at the network device 500. The network device 500 may receive the data (e.g., the metrics 124 as shown in FIG. 1), from one or more user equipment (e.g., the user equipment 102). In a practical example, the network device 500 may receive metric data from a multitude of network devices, which may be tens, hundreds, or more devices that operate within a particular geographic region. Accordingly, receiving the data may include receiving a plurality of metrics from a plurality of devices, where the data may be received in one or more aggregated or individual transmissions that include a plurality of call data and/or application activity for each respective user equipment, for a period of time.

At 604, after the network device 500 receives the data (e.g., data relating to the metrics 124), the one or more processor(s) 512 may generate information associated with one or more different wireless access technologies utilized within different geographic areas of the telecommunications network. As discussed above, the network coverage component 504 may determine what UE 102 have connected to different wireless access technologies, as well as what UE 102 have the capability to connect to the different wireless access technologies.

At 606, the one or more processor(s) 612 may determine, using the network coverage component 504, or some other component, other information associated with the telecommunications network 118. For instance, an aggregated signal strength associated with one or more locations within an area may be determined, a location of transmitters 110 may be determined, and the like. In some examples, the network device 400 may aggregate the data associated with a geographic region. Determining the aggregated data associated with the geographic region may include averaging metrics received from user devices operating within that particular region, or by performing other aggregation techniques.

At 608, the one or more processor(s) 512 may determine a utilization of the different wireless access technologies (e.g., 4G, 5G, . . . ) of the telecommunications network 118. As discussed above, the network coverage component 504 may determine the UEs 102 that utilize one or more wireless access technologies or may utilize one or more of the wireless access technologies. For instance, the network coverage component 504 may determine the UEs 102 that utilize one or more transmitters 110 that are located within an area and what wireless access technologies (e.g., 4G, 5G, . . . ) are used or may be used the UEs 102.

At 610, the one or more processor(s) 512 may generate configuration data that identifies one or more locations to configure one or more network resources of the telecommunications network. As discussed above, the configuration component 120 may identify that a region may not include enough cells (e.g., 5G cells) within a geographic area/region to handle current or predicted load. For instance, the network metrics 124 may indicate that a geographic area is currently congested. The configuration component 120 may also identify that a region may include cells that are not being utilized and/or not predicted to be utilized. The configuration component 120 may also determine other configuration data such as but not limited to adjusting a location of a cell, changing one or more network parameters to improve performance, and the like.

As another example, the configuration component 120 may identify that one or more particular RF resources (e.g., one or more bands) within a region are congested. In response to determining that an RF resource is congested, or more than one RF resource is congested, the configuration component 120 may change the RF resource(s) being utilized at the congested location to a different generation technology if the UEs (or some number of the UEs, such as a majority) support the different generation technology.

As a particular example, assume that a number of UEs are causing congestion in LTE bands 4, 2, 12 and 71 within a particular region. In an attempt to alleviate this congestion, the configuration component 120 determines that many of these UEs (e.g., a majority or some other portion) support an RF resource (e.g., NR band 261, or some other band) that may be utilized to resolve the congestion. Upon determining that another RF resource is available to be utilized that is not congested, the configuration component 120 causes the UEs to utilize the uncongested RF resource (e.g., NR band 261 in this example) to attempt to resolve the congestion.

As another example, assume that many devices in another region are causing congestion in LTE bands 4, 2, 12, and 71. The configuration component 120 determines that many of these UEs (e.g., a majority or some other portion) support an RF resource using a different generation technology (e.g., NR band 71, or some other band). that Majority of the devices are capable of NR band 71. Hence, the configuration component 120 can re-farm the existing LTE band 71 to NR band 71 (fully or can be partially done) to take advantage of the 5G (NR) band utilization efficiency since 5G can deliver more bits than LTE with the same amount of bandwidth Hz). The configuration component 120 may utilize the metrics 124 collected from many UEs to determine how to allocate the available RF resources between the LTE and 5G (e.g., re-farm 80% of the bandwidth while leaving 20% for LTE).

At 612, the one or more processor(s) 312 may generate and provide a UI. As discussed above, the network coverage component 116, the configuration component, or some other device or component may generate and provide a UI for display by one or more computing devices. The UI may include one or more visualizations 126 and/or configurations 122. As discussed above, the visualizations 126 and/or configurations 122 may be presented within a UI on a display associated with the UE 102, and/or provided using some other mechanism.

At 614, the one or more processor(s) 512 may cause one or more actions to occur to configure one or more network resources of the telecommunications network. For example, the actions may be caused to occur automatically (e.g., the configuration component 120 causes an adjustment to one or more parameters and/or configuration of the telecommunications network 118) based at least in part on data associated with the visualization(s) 126 and/or the configuration(s) 122. The configurations may be automatically determined based on one or more of the metrics 124 or be initiated based on an instruction from an authorized user. For instance, one or more transmitters 110 may be installed/positioned/configured based on the metrics. The configuration(s) may indicate to adjust/configure equipment, devices, power settings, equipment settings, placement of the equipment, and/or other features, associated with the telecommunications network. For example, the processor(s) 512 may determine that a particular region has a relatively high number of UEs 102 that can utilize a particular wireless access technology (e.g., 5G, . . . ) but that one or more additional transmitters 110 may be deployed to handle the UEs 102.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method comprising:
    communicating with a plurality of user equipment (UE) to obtain metric data indicative of communications between the plurality of the UE and network transceivers in a telecommunications network;
    generating, based at least in part on the metric data, first utilization data that indicates a first utilization of a first wireless access technology within a first geographic area of the telecommunications network;
    generating, based at least in part on the metric data, second utilization data that indicates a second utilization of the first wireless access technology within a second geographic area of the telecommunications network;
    generating, based at least in part on the first utilization data and the second utilization data, configuration data that identifies one or more locations within one or more of the first geographic area and the second geographic area to configure one or more network resources of the telecommunications network; and
    causing one or more actions to occur to configure one or more network resources within the telecommunications network based, at least in part, on the configuration data,
    wherein the metric data indicative of the communications between the plurality of UE and the network transceivers in the telecommunication network includes at least one of a new radio (NR) band name, a NR radio resource control (RRC) state, a NR primary secondary cell (PSCell) band name, a NR physical downlink shared channel (PDSCH) channel assignment status, a NR PDSCH access status, a NR PDSCH beam index, a NR PSCell signal-to-interference-plus-noise ratio (SINR), a NR rank indicator, a list of synchronization signal block (SSB) signal information, a number of SSB beams detected by the UE, a SSB beam index, or a physical cell ID (PCI) for a cell that transmits the SSB name.

2. The computer-implemented method of claim 1, further comprising exposing an Application Programming Interface (API) utilized by the plurality of UEs to collect at least a portion of the metric data, wherein the API exposes functions for one or more of: a signal strength of a signal between an individual one of the UEs and an one or more of the network transceivers, a type of network that the individual one of the UEs is connected to, a received signal strength, and a reference signal.

3. The computer-implemented method of claim 1, wherein the first access wireless technology is a Fifth Generation (5G) wireless access technology, and wherein generating the configuration data comprises
    determining that the first wireless technology is congested in the first geographic area and uncongested within the second geographic area, and
    identifying one or more 5G cells to add to the first geographic area.

4. The computer-implemented method of claim 1, wherein causing the one or more actions to occur comprises
    determining that a first frequency band utilized by first UEs is congested in the first geographic area,
    determining that a second frequency band that is supported by at least a portion of the first UEs is uncongested within the first geographic area, and causing a first portion of first UEs to utilize the second frequency band.

5. The computer-implemented method of claim 1, wherein causing the one or more actions to occur comprises adding one or more Fifth Generation (5G) cells to the first geographic area.

6. The computer-implemented method of claim 1, further comprising:
    generating, based at least in part on the metric data, third utilization data that indicates a third utilization of a second wireless access technology within the first geographic area of the telecommunications network;
    generating, based at least in part on the metric data, fourth utilization data that indicates a fourth utilization of the second wireless access technology within the second geographic area of the telecommunications network; and
    wherein generating the configuration data is further based at least in part on the third utilization data and the fourth utilization data.

7. The computer-implemented method of claim 1, further comprising:
    generating a graphical user interface (GUI) for display that includes a graphic output comprising:
        a map of the telecommunications network that includes the first geographic area and the second geographic area;
        one or more first graphical indicators displayed within the map that indicates the first utilization; and
        one or more second graphical indicators displayed within the map that indicates the second utilization.

8. The computer-implemented method of claim 1, further comprising generating a message, wherein the message comprises a suggested location to add an additional network transceiver to one or more of the first geographic area and the second geographic area based at least in part on the network metrics; and providing the message to a computing device.

9. A system comprising:
    one or more processors; and
    one or more computer-readable media storing instructions executable by the one or more processors, wherein the instructions, when executed, cause the system to perform operations comprising:

communicating with a plurality of user equipment (UE) to obtain metric data indicative of communications between the plurality of the UE and network transceivers in a telecommunications network;

generating, based at least in part on the metric data, first utilization data that indicates a first utilization of a first wireless access technology within a first geographic area of the telecommunications network;

generating, based at least in part on the metric data, second utilization data that indicates a second utilization of the first wireless access technology within a second geographic area of the telecommunications network;

generating, based at least in part on the first utilization data and the second utilization data, configuration data that identifies one or more locations within one or more of the first geographic area and the second geographic area to configure one or more network resources of the telecommunications network; and causing one or more actions to occur to configure one or more network resources within the telecommunications network based, at least in part, on the configuration data, wherein the metric data indicative of the communications between the plurality of UE and the network transceivers in the telecommunication network includes a new radio (NR) physical downlink shared channel (PDSCH) channel assignment status, a NR PDSCH access status, and a NR PDSCH beam index.

10. The system of claim 9, wherein the operations further comprise exposing an Application Programming Interface (API) utilized by the plurality of UEs to collect at least a portion of the metric data, wherein the API exposes functions for one or more of: a signal strength of a signal between an individual one of the UEs and an one or more of the network transceivers, a type of network that the individual one of the UEs is connected to, a received signal strength, and a reference signal.

11. The system of claim 9, wherein the first access wireless technology is a Fifth Generation (5G) wireless access technology, and wherein generating the configuration data comprises
determining that the first wireless technology is congested in the first geographic area and uncongested within the second geographic area, and
identifying one or more 5G cells to add to the first geographic area.

12. The system of claim 9, wherein generating the configuration data comprises:
determining that a first frequency band utilized by first UEs is congested in the first geographic area,
determining that a second frequency band is uncongested within the first geographic area, and
causing a first portion of first UEs to utilize the second frequency band.

13. The system of claim 9, wherein causing the one or more actions to occur comprises adding one or more Fifth Generation (5G) cells to the first geographic area.

14. The system of claim 9, wherein the operations further comprise:
generating, based at least in part on the metric data, third utilization data that indicates a third utilization of a second wireless access technology within the first geographic area of the telecommunications network;
generating, based at least in part on the metric data, fourth utilization data that indicates a fourth utilization of the second wireless access technology within the second geographic area of the telecommunications network; and
wherein generating the configuration data is further based at least in part on the third utilization data and the fourth utilization data.

15. The system of claim 9, wherein the operations further comprise:
generating a graphical user interface (GUI) for display that includes a graphic output comprising:
a map of the telecommunications network that includes the first geographic area and the second geographic area;
one or more first graphical indicators displayed within the map that indicates the first utilization; and
one or more second graphical indicators displayed within the map that indicates the second utilization.

16. The system of claim 9, wherein the operations further comprise generating a message, wherein the message comprises a suggested location to add an additional network transceiver to the first geographic area; and providing the message to a computing device.

17. A non-transitory computer-readable medium storing instructions that, when executed, cause one or more processors to perform operations, comprising:
communicating with a plurality of user equipment (UE) to obtain metric data indicative of communications between the plurality of the UE and network transceivers in a telecommunications network;
generating, based at least in part on the metric data, first utilization data that indicates a first utilization of a first wireless access technology within a first geographic area of the telecommunications network;
generating, based at least in part on the metric data, second utilization data that indicates a second utilization of the first wireless access technology within a second geographic area of the telecommunications network;
generating, based at least in part on the first utilization data and the second utilization data, configuration data that identifies one or more locations within one or more of the first geographic area and the second geographic area to configure one or more network resources of the telecommunications network; and
causing one or more actions to occur to configure one or more network resources within the telecommunications network based, at least in part, on the configuration data,
wherein the metric data indicative of the communications between the plurality of UE and the network transceivers in the telecommunication network includes a list of synchronization signal block (SSB) signal information, a number of SSB beams detected by the UE, a SSB beam index, and a physical cell ID (PCI) for a cell that transmits the SSB name.

18. The non-transitory computer-readable medium of claim 17, wherein the operations further comprise exposing an Application Programming Interface (API) utilized by the plurality of UEs to collect at least a portion of the metric data, wherein the API exposes functions for one or more of: a signal strength of a signal between an individual one of the UEs and an one or more of the network transceivers, a type of network that the individual one of the UEs is connected to, a received signal strength, and a reference signal.

19. The non-transitory computer-readable medium of claim 17, wherein the first access wireless technology is a Fifth Generation (5G) wireless access technology, and wherein generating the configuration data comprises
- determining that the first wireless technology is congested in the first geographic area and uncongested within the second geographic area, and
- identifying one or more 5G cells to add to the first geographic area.

20. The non-transitory computer-readable medium of claim 17, wherein the operations further comprise generating a graphic output comprising:
- one or more first graphical indicators that indicates the first utilization; and
- one or more second graphical indicators that indicates the second utilization.

\* \* \* \* \*